(12) United States Patent
Eccles et al.

(10) Patent No.: US 8,789,656 B2
(45) Date of Patent: Jul. 29, 2014

(54) SHAFT BEARING LUBRICANT AERATOR, SYSTEM, AND METHOD

(75) Inventors: Steven Robert Eccles, Torrance, CA (US); Davis Jensen, Lomita, CA (US)

(73) Assignee: Honeywell International Inc., Morristown, NJ (US)

( * ) Notice: Subject to any disclaimer, the term of this patent is extended or adjusted under 35 U.S.C. 154(b) by 437 days.

(21) Appl. No.: 13/285,251

(22) Filed: Oct. 31, 2011

(65) Prior Publication Data
US 2013/0109481 A1    May 2, 2013

(51) Int. Cl.
*F16H 57/04*  (2010.01)
*F16C 33/66*  (2006.01)

(52) U.S. Cl.
CPC ......... *F16C 33/6677* (2013.01); *F16C 33/6662* (2013.01); *F16C 2360/23* (2013.01); *F16C 2361/55* (2013.01); *F16C 2360/42* (2013.01)
USPC .......................................... 184/6.12; 184/7.1

(58) Field of Classification Search
CPC ............ F16H 57/0427; F16H 57/0471; F16H 57/0494
USPC ...................... 184/6.11, 6.12, 6.26, 7.1; 464/7
See application file for complete search history.

(56) References Cited

U.S. PATENT DOCUMENTS

| | | | |
|---|---|---|---|
| 3,746,129 A | | 7/1973 | Knapp et al. |
| 4,391,349 A | | 7/1983 | Carroll et al. |
| 5,054,583 A | | 10/1991 | Wrzyszczynski |
| 5,071,390 A | * | 12/1991 | Latshaw .............................. 464/7 |
| 5,253,733 A | * | 10/1993 | Miyachi ........................ 184/6.26 |
| 5,591,020 A | * | 1/1997 | Rockwood ................ 417/423.13 |
| 7,174,997 B2 | * | 2/2007 | Sheridan ........................ 184/6.26 |
| 7,980,361 B2 | * | 7/2011 | Omoto et al. ................. 184/6.12 |
| 8,602,166 B2 | * | 12/2013 | Mullen et al. ................ 184/6.26 |
| 2006/0054409 A1 | * | 3/2006 | Miyazaki et al. ............ 184/6.12 |
| 2006/0060425 A1 | * | 3/2006 | Richardson et al. ......... 184/55.1 |
| 2006/0065488 A1 | * | 3/2006 | Sugihara et al. ............. 184/6.12 |
| 2008/0060877 A1 | * | 3/2008 | Klose ........................... 184/6.12 |
| 2008/0251324 A1 | * | 10/2008 | Kuryu ........................... 184/6.12 |

FOREIGN PATENT DOCUMENTS

GB           806922           1/1959

OTHER PUBLICATIONS

Stanley I. Pineel et al., Comparison Between Oil-mist and Oil-Jet Lubrication of High Speed, Small Bore, Angular-Contact Bearings; NASA—56th Annual Meeting sponsored by the Society of Tribologists and Lubrication Engineers; NASA, NASA Center for Aerospace Information 7121 Standard Drive, Hanover, MD 21076; Aug. 2001.

* cited by examiner

*Primary Examiner* — William E Dondero
*Assistant Examiner* — Robert T Reese
(74) *Attorney, Agent, or Firm* — Shimokaji & Assoc., P.C.

(57) ABSTRACT

A system for lubricating a remote bearing in rotating machinery is disclosed. An aerator is coupled on an end of a shaft distally from a gearbox and on a far side of an obstruction coupled to the shaft. Oil is carried centrifugally along an inner diameter wall of the shaft while air is carried along a central axis of the shaft. The aerator may include an axial groove for receiving oil from the inner diameter wall of the shaft. The aerator may further include a radial passage for carrying air into the oil to provide a misted lubricant that may be provided into the remote bearing.

4 Claims, 6 Drawing Sheets

SHAFT BEARING LUBRICANT AERATOR, SYSTEM, AND METHOD

BACKGROUND OF THE INVENTION

The present invention generally relates to shaft lubrication systems, and more particularly, to a shaft bearing lubricant aerator, system, and method.

Turbomachinery typically employ bearings to support rotating components. The bearings typically require lubrication and removal ("scavenging") of the lubrication to prevent overheating and flooding. Typically there is a lubricating oil sump located adjacent to some of the bearings. Bearings near the lubrication sump may receive lubricant from a dedicated passage leading from the sump. Air may be provided to these bearings via a separately dedicated passage. Another set of passages may also be provided to scavenge the air and oil from the bearings. However, the turbine wheel may obstruct the use of direct passages to remotely located bearings that are not positioned near the sump.

As can be seen, there is a need for a system and method of providing oil and air to a remote bearing from a common point.

SUMMARY OF THE INVENTION

In one aspect of the present invention, a shaft bearing lubricating system configured to circulate a lubricant comprises a gearbox; a shaft coupled on a first end to the gearbox; and an oil aerator coupled to a second end of the shaft positioned in fluid communication between the first end of the shaft and a bearing disposed proximate the second end of the shaft distally from the gearbox.

In another aspect of the present invention, a shaft bearing lubricating system comprises a lubrication source; a central shaft including a hollow passageway in fluid communication with the lubrication source at a first end of the shaft; a ring attached to a second end of the shaft, the ring including: a tubular wall defining a radial passage extending from a central axis of the ring through an outer diameter of the ring in fluid communication with a bearing positioned proximate the second end of the shaft, wherein a bore in the shaft is disposed between the radial passageway and the bearing, and a groove wall defining an axial groove disposed proximate the outer diameter of the ring intersecting the radial passage.

In still yet another aspect of the present invention, method of lubricating a bearing positioned on a side of an obstruction opposite from a lubrication source includes providing a hollow shaft connecting the obstruction to the lubrication source; rotating the shaft; drawing the lubrication centrifugally along an inner wall of the shaft; drawing air along a central axis of the shaft; mixing the lubrication with the air to create a lubricant mist; and providing the lubricant mist to the bearing.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, an embodiment of the present invention generally provides an apparatus, system and method of lubricating bearings in machinery with rotating components such as shafts. Engines or motors may typically include shafts rotating other components such as turbine wheels, compressors, or flywheels. While the following disclosure is described primarily in the context of a turbomachine, it will be understood that aspects of the subject technology may be also employed generally to engines or motors with rotating shafts that benefit from lubricated bearings located remotely from a lubrication source. A "remote" bearing as described in the following disclosure may be one that is located relatively distant from a lubrication source. For example, typically in machinery there are two or more bearings in the assembly to support rotating components. In the case of a machine that includes a gearbox, there could be a series of several bearing pairs supporting the various shafts of the machine. In turbomachinery, a turbine, compressor, or other type of wheel may be straddle-mounted on a support shaft between bearings. The wheel or other component straddle-mounted to the shaft may be an obstruction for passages providing lubricant to the bearings. For example, there is sometimes a bearing that is "remote" from the lubrication system positioned on the far side of the wheel away from the lubrication source.

In one aspect, exemplary embodiments disclosed may provide a single passageway for both air and oil to communicate past a turbine wheel. In another aspect, oil may be aerated to provide a misted lubricant to a bearing remotely located from a lubricant source. Still yet, in another aspect, misted lubricant may be drawn into the remote bearing and drawn out therefrom by vacuum forces provided by exemplary embodiments of the systems disclosed.

Figure 1:
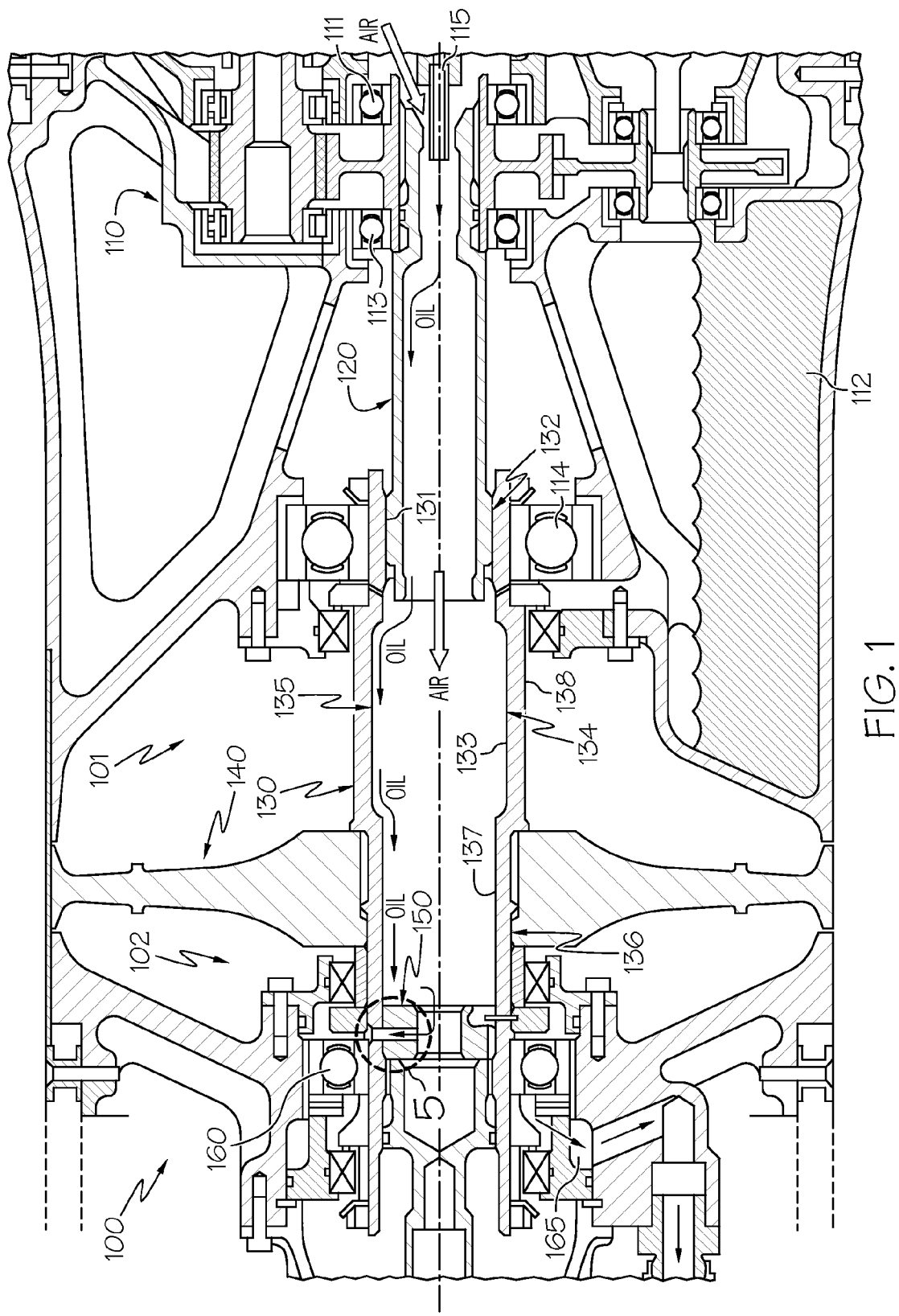
FIG. 1 is a cross-sectional plan side plan view of a shaft bearing lubricating system according to an exemplary embodiment of the present invention.

Referring now to FIG. 1, a shaft bearing lubricating system 100 is shown according to an exemplary embodiment of the present invention. The shaft bearing lubrication system 100 may be employed in a turbomachine setting as shown. In this exemplary environment, the shaft bearing lubricating system 100 may include a lubricant source 115, a central shaft 130, and an aerator 150. The shaft bearing lubricating system 100 may also include a gearbox 110 and an obstruction 140 coupled to the central shaft 130. In the context of the turbomachine environment described, the central shaft 130 will be referred to herein as a turbine shaft 130 and the obstruction 140 will be referred to herein as a turbine wheel 140. The gearbox 110 may be positioned on a proximate end of the turbine shaft 130. A remote bearing 160 may be attached to a distal end of the turbine shaft 130 so that the remote bearing 160 is distal from the gearbox 110. The remote bearing 160 and the gearbox 110 may be positioned on opposite sides of the turbine wheel 140. The lubricant source 115, for example, an oil inlet, may be positioned near the gearbox 110 to provide lubricant received from a source such as an oil sump 112. The fluid connection of the oil sump 112 to the oil inlet 115 is omitted for sake of illustration. Air may be provided from the gearbox 110 through an annulus surrounding the oil inlet 115. The shaft bearing lubricating system 100 may be a closed system including a vacuum pump (not shown) to circulate lubricant from the lubricant source 115 to the remote bearing 160 and back to the lubricant source 115.

In one aspect, the turbine shaft 130 may provide a common passageway for air and oil to travel through passing the turbine wheel 140 en route to the remote bearing 160. A hollow quill shaft 120 may couple the lubricant source 115 to a first end of the turbine shaft 130. The aerator 150 may be coupled to a second end of the turbine shaft 130. The quill shaft 120 may be coupled to the turbine shaft 130 so that a common central axis runs linearly from the oil inlet 115 through the quill shaft 120, the turbine shaft 130, and the aerator 150.

For sake of illustration, exemplary embodiments of the shaft bearing lubricating system 100 may be described as a pre-turbine wheel section 101 and a post-turbine wheel section 102. The turbine wheel 140 may define the border between the pre-turbine wheel section 101 and the post-turbine wheel section 102. The turbine shaft 130 may overlap the pre-turbine wheel section 101 and the post-turbine wheel section 102.

Figure 2:
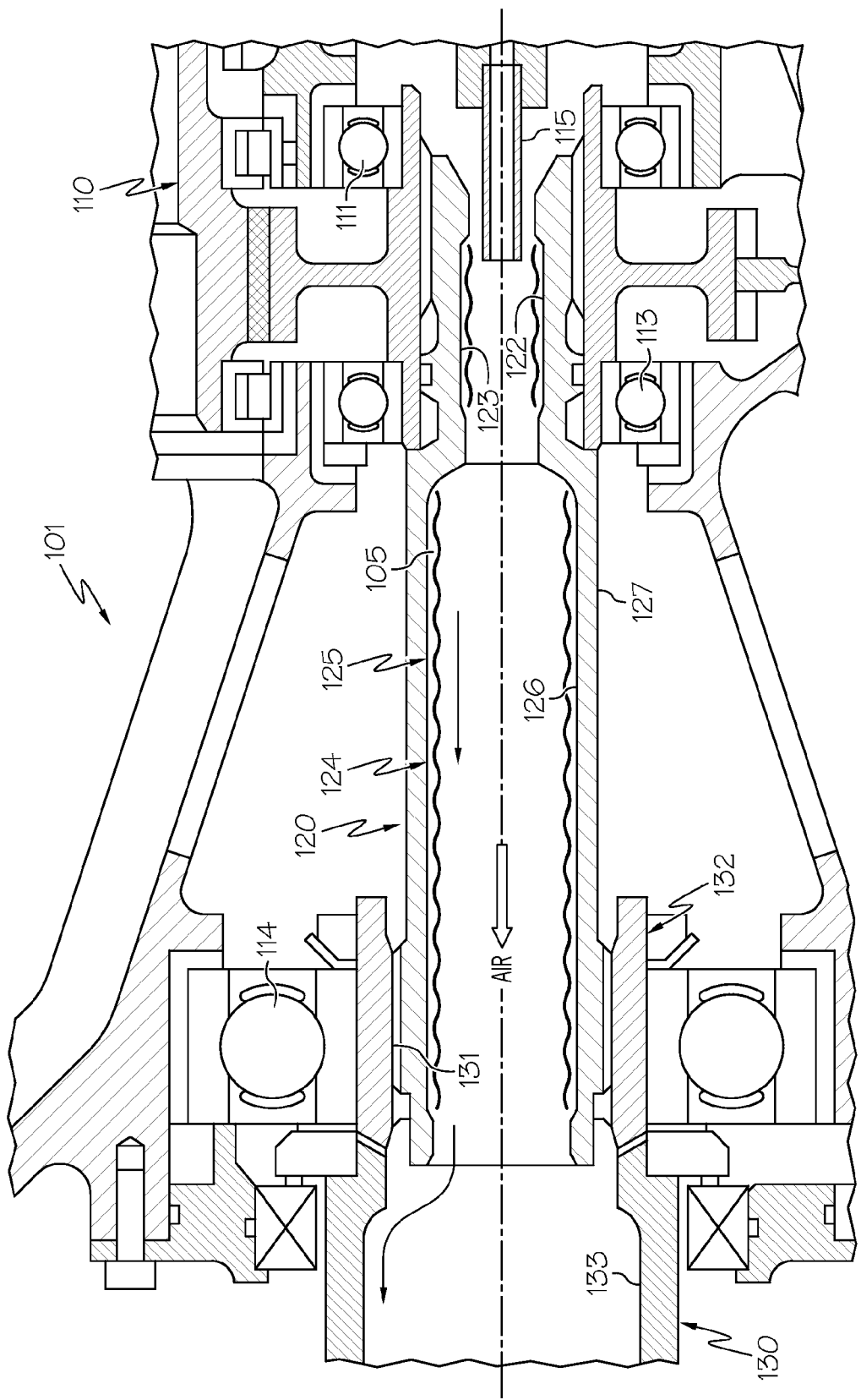
FIG. 2 is an enlarged partial view of a pre-turbine wheel section of the shaft bearing lubricating system of FIG. 1.
Figure 3:
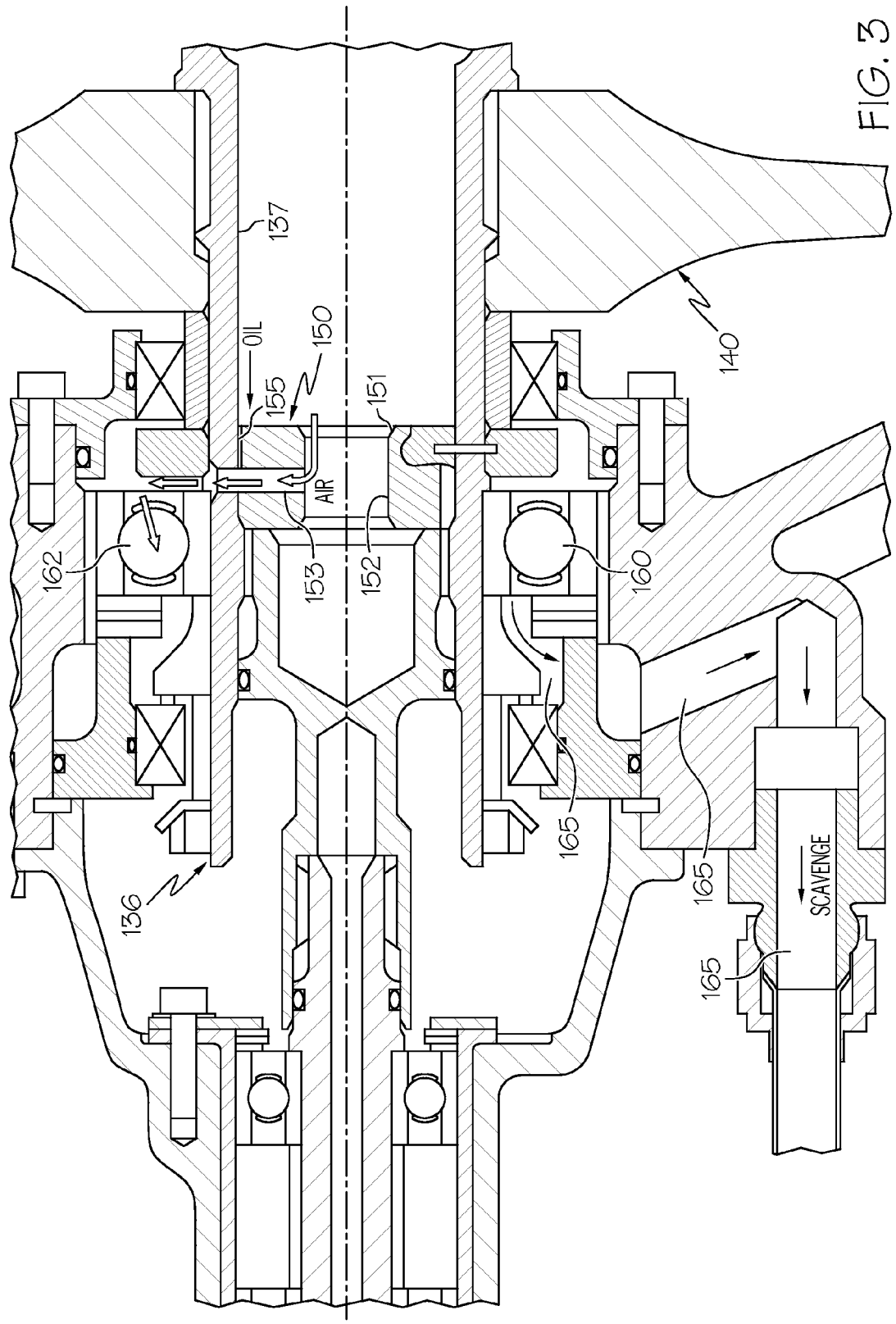
FIG. 3 is an enlarged partial view of a post-turbine wheel section of the shaft bearing lubricating system of FIG. 1.
Figure 4:
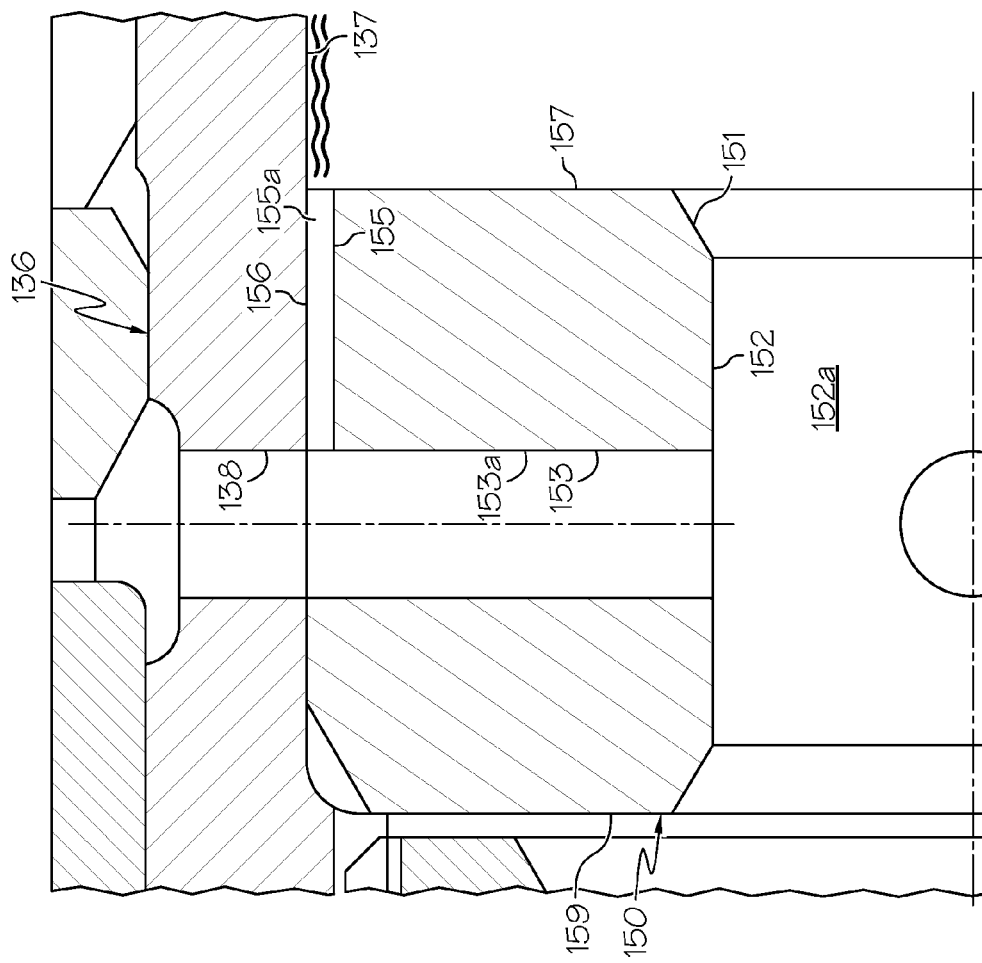
FIG. 4 is an enlarged partial view of an aerator used in the shaft bearing lubricating system of FIG. 1.
Figure 5:
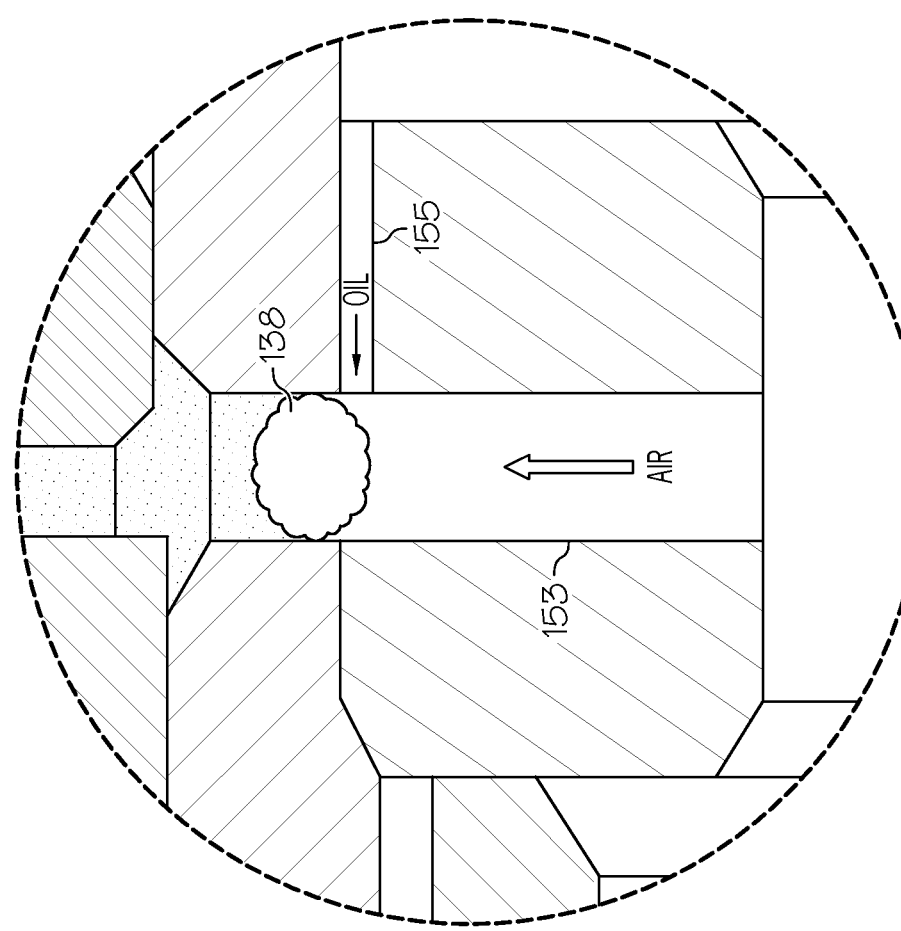
FIG. 5 is an enlarged view of the circle 5 of FIG. 1.
Figure 6:
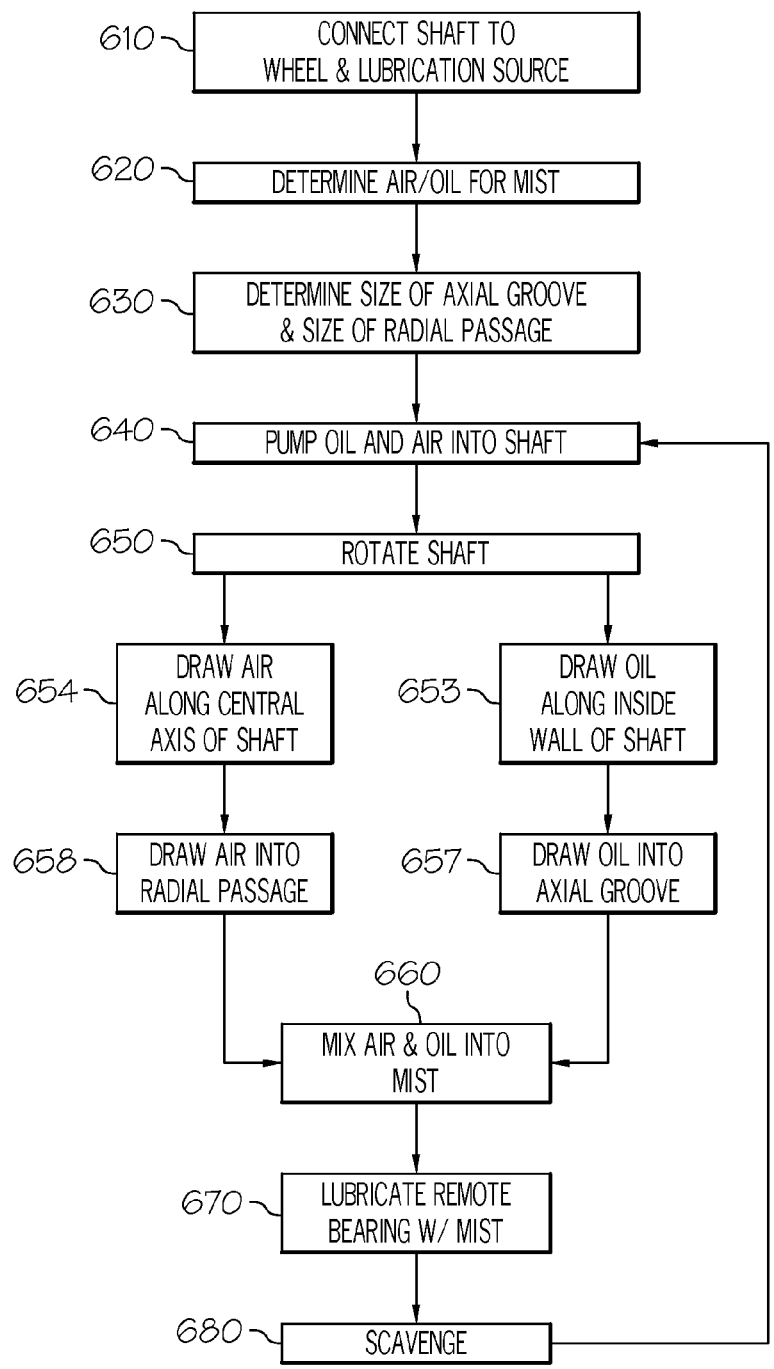
FIG. 6 is a flowchart of a series of steps according to another exemplary embodiment of the present invention.

Referring to FIGS. 1, 2, and 6, the shaft bearing lubricating system 100 is shown and described with further detail, an enlarged sectional view of pre-turbine wheel section 101 is shown, and a method 600 according to exemplary embodiments of the present invention is disclosed. The pre-turbine wheel section 101 may include the gearbox 110, lubrication source 115, quill shaft 120, and turbine shaft 130. The quill shaft 120 may be connected to the gearbox 110 to couple the turbine shaft 130 to the gearbox 110 (step 610). A bearing 113 may be attached to the junction of the gearbox 110 to the first end of the quill shaft 120.

The quill shaft 120 may include a first section 123 with a first inner diameter wall 122, a second section 124 including a second inner diameter wall 126 flaring outward from and being diametrically wider than the first inner diameter wall 122, and an outer diameter wall 127. The interior of the second section 124 may be considered a first centrifuge 125. The oil inlet 115 may be disposed within a first end of the quill shaft 120, projecting at least partially into an open space within the first section 123. Air may enter the first section 123 by passing around the oil inlet 115. Bearings 111 and 113 may be attached to the connection of the quill shaft 120 to the gearbox 110.

The turbine shaft 130 may be hollow and may include first, second and third sections 132; 134; and 136 including respective first, second, and third inner diameter walls 131; 133; and 137. The turbine shaft 130 may also include an outer wall 138. The second inner diameter wall 133 may be diametrically wider than the first and third inner diameter walls 131 and 137. The second section 134 may be considered a second centrifuge chamber 135. The quill shaft 120 outer diameter wall 127 may fit within the turbine shaft 130 first section 132. A bearing 114 may be attached to the junction of the quill shaft 120 and the turbine shaft 130.

The amount of air and oil desired for a mist may be predetermined (step 620). Lubricant, for example, oil and air from separate sources may be introduced into the quill shaft 120 (step 640). The effect of the vacuum pump (not shown) on the lubricant may constantly draw the lubricant through the quill shaft 120 and turbine shaft 130. Some incidental initial mixing of air and oil may occur during introduction of oil and air into the quill shaft 120 first section 123. Rotation of the quill shaft 120 and turbine shaft 130 (step 650) may centrifugally bias movement of the oil toward their respective inner diameter walls (122; 126 and 133; 137). For example, as oil is drawn into the first centrifuge chamber 125, oil may separate from air and accumulate onto the quill shaft 120 second inner diameter wall 126 (Step 653). As oil encounters the second centrifuge section 135, increased separation of oil from air may occur. As oil is centrifuged into a layer 105 along the inner diameter walls 122; 126, 133, and 137 air may travel substantially oil free down the central axis of the quill shaft 120 and turbine shaft 130 toward the aerator 150 (Step 654). Centrifuged oil traveling out of the second centrifuge 135 may encounter increased pressure when reaching the turbine shaft third inner diameter wall 137.

Referring now to FIGS. 3, 4, 5 and 6, enlarged sectional views of the post-turbine wheel section 102 and the aerator 150 are shown, along with additional elements of the method 600. The post-turbine wheel section 102 may include the turbine shaft 130, the aerator 150, and the remote bearing 160. The aerator 150 may be a ring attached proximate to the second end of the turbine shaft 130. The aerator 150 may include first and second planar sides 157 and 159, an outer diameter wall 156 and an inner diameter wall 152. The inner diameter wall 152 may define an entrance cavity 152a with an open end on the first planar side 157. A beveled edge 151 on the first planar side 157 may be positioned at the entrance of the cavity 152a. The second planar side 159 may seal the cavity 152a off from other components in the turbine third wall section 136 positioned aft of the aerator 150.

The aerator 150 may also include a tubular wall 153 defining a radial passage 153a extending from a center point of the aerator 150 to the outer diameter wall 156. The tubular wall 153 may provide an air passageway through the aerator 150 toward the inner diameter wall 137. The diameter of the tubular wall 153 may be smaller than the inner diameter wall 152.

The aerator 150 may also include a groove wall 155 defining an axial groove 155a proximate the outer diameter wall 156. The axial groove 155a may be disposed to align with the third inner diameter wall 137 of the turbine shaft 130 to provide an oil passageway into the aerator. The axial groove 155a may also intersect transversely with the radial passage 153a at a point proximate the turbine shaft third inner diameter wall 137. The diameter of the axial groove 155a may be smaller than the diameter of the radial passage 153a.

While only one radial passage 153a and axial groove 155a are shown, it will be understood that multiple radial passages or axial grooves may be employed. Also, while the aerator 150 has been described in terms of the axial groove 155a and radial passage 153a shown, other exemplary embodiments may adjust the oil to air ratio of the lubricant drawn into the remote bearing 160 by adjusting the size of the axial groove wall 155 and tubular wall 153 accordingly (step 630).

The turbine shaft third wall section 136 may include a bore 138 aligned with the radial passage 153 *a* The bore 138 may be in fluid communication with a remote bearing cavity 162 disposed to provide fluid into the remote bearing 162. A scavenging outlet passage 165 may be disposed on a lower side of the remote bearing 160 for misted lubricant to be drawn away from the remote bearing back to the lubrication pump.

Centrifuged oil traveling along the turbine shaft third inner diameter wall 137 may flow into the aerator axial groove 155*a* (Step 657). Air traveling along the central axis of the turbine shaft third inner diameter wall section 136 may flow into the aerator cavity 152*a* (Step 658). As air travels from the beveled edge 151 into the aerator 150, a pressure rise may hasten air movement into the cavity 152*a* Rotation of the aerator 150 may draw the air into the radial passage 153*a* The difference in magnitudes of the aerator inner diameter wall 152 and the tubular wall 153 may create increased fluid velocity in the air flowing through the radial passage 153*a* providing a venturi effect as the air encounters oil flowing out of the axial groove 155*a*. The larger volume of air encountering the oil may create an oil-air mix with air dominating the oil to air ratio, thus creating in some exemplary embodiments, a misted lubricant (Step 660). The misted lubricant may flow into the bore 138 out of the turbine shaft 130 and into the remote bearing cavity 162 lubricating the rotating remote bearing 160 (Step 670). Misted lubricant may then be drawn away from the remote bearing 160 and circulated to the oil sump 112 (FIG. 1) through the scavenging outlet passage 165 (Step 680).

It should be understood, of course, that the foregoing relates to exemplary embodiments of the invention and that modifications may be made without departing from the spirit and scope of the invention as set forth in the following claims.

We claim:

1. A method of lubricating a bearing positioned on a side of an obstruction opposite from a lubrication source, including:
   providing a hollow shaft connecting the obstruction to the lubrication source;
   rotating the shaft;
   drawing oil from the lubrication source centrifugally along an inner wall of the shaft;
   drawing air along a central axis of the shaft;
   mixing the oil with the air to create a lubricant mist;
   providing the lubricant mist to the bearing;
   providing an oil passageway longitudinal to the inner wall of the shaft; and
   providing an air passage traversing the oil passageway wherein the mixing occurs at an intersection of the oil passageway and the air passage.

2. The method of claim 1, including providing a vacuum pump drawing the air into the oil at the intersection of the oil passageway and the air passage.

3. The method of claim 1, including creating a venturi force at the intersection of the oil passageway and the air passage.

4. The method of claim 1, determining a ratio of oil to air in the lubricant mist by adjusting a size of the oil passageway.

* * * * *